V. F. DECKERT.
DIFFERENTIAL MECHANISM.
APPLICATION FILED OCT. 2, 1917.
1,290,111.
Patented Jan. 7, 1919.
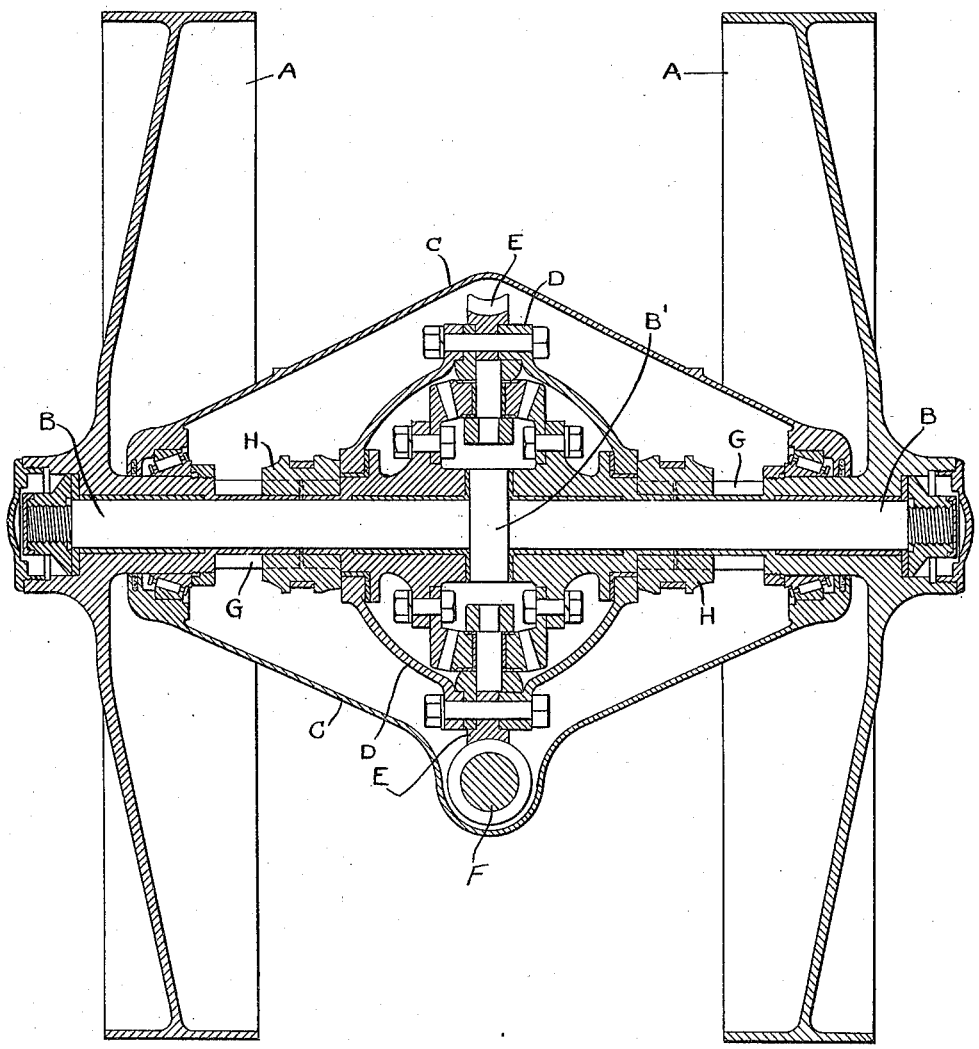
INVENTOR.
Virgil F. Deckert
BY Gordon Grimes
ATTORNEYS.

UNITED STATES PATENT OFFICE.

VIRGIL F. DECKERT, OF MINNEAPOLIS, MINNESOTA.

DIFFERENTIAL MECHANISM.

1,290,111.      Specification of Letters Patent.      Patented Jan. 7, 1919.

Application filed October 2, 1917. Serial No. 194,317.

*To all whom it may concern:*

Be it known that I, VIRGIL F. DECKERT, a citizen of the United States of America, residing in the city of Minneapolis, in the county of Hennepin and State of Minnesota, have invented a new and useful Differential Mechanism, of which the following is a specification.

My invention relates to improvements in the construction of traction engines or motor vehicles and more particularly to the differential and rear axle construction therein and has for its objects to provide a cheaper, simpler and stronger machine which will operate with less loss of power through friction.

I accomplish these objects by means of the mechanism illustrated in the accompanying drawing which is a sectional view of a portion of the machine. Similar letters of reference refer to similar parts of the machine. Drive wheels A are rotatably mounted upon each end of solid shaft B. Collar B' is rigidly mounted upon shaft B and serves to hold differential D in position on shaft B. Differential D is rotatably mounted upon shaft B and is driven by gear E and worm F. Sleeves G are rotatably mounted upon shaft B and are a part of the hubs of drive wheels A. Clutches H are slidably mounted upon the sleeves of differential D and sleeves G so that when in the positions shown in the drawing clutches H engage and hold firmly together the inner frames of differential D and sleeves G. If desired the clutches may be omitted and the inner frames of differential D may be positively engaged to the hubs of drive wheels A at all times. Differential housing C is mounted upon the hubs of wheels A by adjustable roller bearings C¹.

By this mechanism its component parts are held more firmly and rigidly in position and the greater strains are carried by larger and stronger parts than in other constructions, thereby greatly increasing the efficiency of the machine. One advantage in having clutch H, is the ability to coast which would otherwise be impractical where a worm drive is used. Another advantage is that the tractor can be moved about freely without the use of the engine when the clutches disengage the wheels and differential.

I claim:

1. A transmission mechanism comprising a shaft, a drive wheel rotatably mounted upon each end of said shaft, a collar rigidly secured to said shaft between the ends thereof, a differential rotatably mounted upon said shaft and said collar, two sleeves rotatable upon said shaft and extending from opposite sides of the differential toward said drive wheels, said sleeves being spaced from each other by said collar whereby the differential is held positioned upon said shaft, and connections between said sleeves and said drive wheels.

2. A transmission mechanism comprising a shaft, a drive wheel rotatably mounted upon each end of said shaft, a collar rigidly secured to said shaft between the ends thereof, a differential rotatably mounted upon said shaft and said collar, two sleeves rotatable upon said shaft and extending from opposite sides of the differential toward said drive wheels, said sleeves being spaced from each other by said collar whereby the differential is held positioned upon said shaft, and clutches between said sleeves and drive wheels whereby the latter may be clutched or unclutched with relation to the differential.

In testimony whereof I have hereunto set my signature in the presence of two witnesses.

VIRGIL F. DECKERT.

Witnesses:
E. I. PEABODY,
D. F. MCMAHON.

Copies of this patent may be obtained for five cents each, by addressing the "Commissioner of Patents, Washington, D. C."